United States Patent Office 3,510,512
Patented May 5, 1970

3,510,512
METHOD FOR PREPARING STABLE
MONOPERPHTHALIC ACID
Eric Jourdan-Laforte, Lyon, France, assignor to L'Air Liquide, Societe Anonyme pour l'Etude et l'Exploitation des Procedes Georges Claude
No Drawing. Filed July 15, 1966, Ser. No. 565,403
Claims priority, application France, July 29, 1965, 26,503; June 9, 1966, 64,761
Int. Cl. C07c 73/10
U.S. Cl. 260—502      9 Claims

ABSTRACT OF THE DISCLOSURE

A method for preparing stable monoperphthalic acid is disclosed in which the phthalic anhydride and hydrogen peroxide, used in proportions of 0.5 to 1.5 atoms of active oxygen per molecule of phthalic anhydride, are caused to react in a halogenated hydrocarbon such as 1,2-dichloromethane, 1,1,2-trichloro-1,2,2-trifluoroethane, 1,2-dichloropropane, 1,1,2,2-tetrachloroethane and 1,1,2-trichloroethane in which the monoperphthalic acid is insoluble. The reaction is carried out in the presence of an alkaline catalyst at a temperature between ambient temperature and 40° C. and the reaction medium is acidified upon completion of the peroxidation. The peracid formed is then separated by precipitation from the reaction medium.

---

The present invention concerns the preparation of monoperphthalic acid and, more particularly, the production of this peracid in a stable form by the reaction of phthalic anhydride with a peroxidised compound.

It is known to prepare monoperphthalic acid by causing oxygenated water to react with phthalic anhydride in the aqueous phase in an alkaline medium acidified at the end of the reaction. This method and its variants are described in Organic Synthesis, volume III, page 619 (1955), and by G. B. Payne in Journal of Organic Chemistry, volume 24, page 1354 (1959)—and in French Pat. No. 934,775 of Feb. 4, 1941. In the absence of an alkaline cation, the perhydrolysis reaction may also be catalysed by tertiary amino oxides, as in French Pat. No. 1,265,609 of Aug. 18, 1960, or promoted by raising the temperature, as is described in U.S. Pat. No. 2,273,774 of Oct. 8, 1940.

To isolate the peracid formed, it is necessary in all these methods to evaporate the aqueous solutions or their organic extracts; these operations considerably reduce the yield and, furthermore, are not without danger when carried out on an industrial scale, particularly in the case of extraction of the peracid by ether.

The result is that such methods of preparation can only be used for the production of peracid solutions to be used as such, for example, for carrying out oxidation, bleaching operations, or epoxidation.

Through French Pat. No. 1,354,160 of Jan. 11, 1963, in the name of the present assignee, it is also known to prepare a mixture of monoperphthalic acid and mineral salts by reaction of phthalic anhydride and a peroxidised compound in the presence of an alkaline metal hydroxide or of ammonia, in an organic medium consisting of lower esters of carboxylic acid in which the monoperphthalic acid is insoluble.

This method enables the monoperphthalate to be isolated by precipitation from the reaction medium, and then requires the conversion of the per salt into its acid form which only leads to a mixture of monoperphthalic acid and mineral salts being obtained.

The method constituting the object of the present invention enables stable monoperphthalic acid of higher concentration than the products obtained by the previously described techniques to be obtained directly and with an increased yield and without recourse to evaporation.

Additionally, this method offers the advantage of great safety in handling, due to the medium in which the reaction is carried out and to the direct production of the per acid without isolation of an intermediate monoperphthalate.

The method of the invention consists in causing phthalic anhydride and hydrogen peroxide used in proportions of 0.5 to 1.5 atoms of active oxygen per molecule of phthalic anhydride to react in an organic medium in the presence of an alkaline catalyst, then in acidifying the reaction medium on completion of the peroxidation reaction. It is characterised in that use is made of a non-oxidisable organic medium in which the phthalic anhydride is soluble and in which the monoperphthalic acid is insoluble, and in separating the peracid formed by precipitation from this medium.

The monoperphthalic acid obtained is stable and may be employed direct for bleaching operations, or used for oxidation reactions such as epoxidation.

The organic media in which the phthalic anhydride is soluble and the monoperphthalic acid insoluble are preferably non-oxidisable solvents of very low water-miscibility, such as halogenated derivatives of aliphatic hydrocarbons, in particular 1,2-dichloroethane.

Also it has been found that certain polyhalogenated aliphatic hydrocarbons, in which phthalic anhydride is even sometimes quite difficult to dissolve, are very suitable for carrying out the process. In particular, these are trichloromethane, 1,1,2-trichloro-1,2,2-trifluoroethane, 1,1-dichloropropane, 1,1,2-trichloroethane and 1,1,2,2-tetrachloroethane.

The phthalic anhydride, preferably powdered, is introduced into these media and there is then added hydrogen peroxide in a quantity such that the ratio of active oxygen per molecule of phthalic anhydride lies between 0.5 and 1.5, and preferably between 1 and 1.2.

The peroxidised compound, according to a preferred variant of the invention, is introduced in the form of an aqueous solution of hydrogen peroxide of a concentration lying between 50 and 98%.

The reaction medium is then vigourously agitated so as to emulsify the aqueous phase in the solvent.

This reaction medium also contains an alkaline catalyst which is added after the oxidising agent, preferably in the form of an aqueous solution, in a quantity such that the cation/phthalic anhydride molar ratio is between 0.01 and 0.2. The alkaline agent can either be an alkaline hydroxide such as potash and soda, or ammonia.

The alkaline agent is only utilised as a catalyst and in a quantity considerably lower than required to obtain the per salt.

If the solvent has become over-saturated with phthalic anhydride, or in the case of a reaction carried out in medium in which the phthalic anhydride does not dissolve well, the anhydride becomes completely soluble upon introduction of the catalyst.

Upon the re-appearance of clouding in the reaction medium, indicating the end of the peroxidation reaction, acidification is carried out with a strong mineral acid such as phosphoric, nitric, or sulphuric acid. This acid is added in amounts of 0.8 to 1.5, and preferably of 1 to 1.3 acid equivalent per alkaline cation initially introduced.

Throughout all these operations, the temperature is held at a value below the boiling temperature of the solvent, and preferably between ambient temperature and 40° C.

The precipitate of monoperphthalic acid formed is drained and then dried in a vacuum, or by a current of dry air, the per acid being preferably maintained at a temperature below 50° C.

A yield of crude monoperphthalic acid can be obtained of more than 95% with a titre of between 85 and 90% and even more.

The method of the invention will preferably be used for manufacture on a continuous basis, the wet solvent generally solubilising a fraction of per acid, up to 5% in certain cases.

The stability of the monoperphthalic acid thus prepared is greater than that of a product purified by re-crystallisation. The titre losses are often less than 0.5% of the per acid content per month at ambient temperature during several months.

According to a variant of the invention, a method of preparation has been discovered which leads to a monoperphthalic acid being obtained which has a considerably enhanced stability on storage and, depending upon the way it is applied, leads to a not inconsiderable increase in yield.

This mode of application is characterized in that at the end of the reaction before separating the monoperphthalic acid precipitate, the water and the residual hydrogen peroxide are extracted by azeotropic distillation.

This distillation is carried out under a pressure such that the temperature of the reaction mixture is kept between 0 and 60° C., and preferably between 10 and 40° C.

Numerous organic solvents can be used as vehicles for the azeotropic distillation. They are selected according to the following criteria:

(a) They must be liquid at normal pressure and at the reaction temperature;

(b) They should not dissolve the monoperphthalic acid, or only to a slight extent;

(c) they should not be miscible with water, or only slightly so;

(d) They should be inert or only slightly reactive with regard to hydrogen peroxide, monoperphthalic acid and the alkaline and acid reagents;

(e) They should form an azeotrope with water at minimum boiling point and should be as rich as possible in water at temperatures of between 0 and 60° C., and preferably of between 15 and 40° C.;

(f) They should possibly, but preferably, actually be good solvents for phthalic anhydride.

Practically all the halogenated, saturated aliphatic hydrocarbons can be used. However, the derivatives forming the azeotropes which are the richest in water at temperatures between 15 and 40° C. will be preferred, so as to reduce the time during which the monoperphthalic acid is in contact with water.

1,1,2-trichloro - 1,2,2-trifluoroethane which forms an azeotrope with 16.4% of water under normal pressure, as well as 1,2-dichloroethane which forms an azeotrope with 8.2% of water at normal pressure and with 4.9% of water at 200 millibars, and 1,2-dichloropropane which forms an azeotrope with 12% of water under normal pressure are thus of particular interest.

This method can be applied in one of the following ways:

(a) The vapours of the azeotrope are condensed under conditions such that the the aqueous phase is eliminated and the halogenated solvent recycled as a continuation to the evaporation. When no more aqueous phase can be extracted, the operation is stopped and the suspended per acid is separated from the solvent by the usual means.

(b) A quantity of solvent is used which is greater than the quantity theoretically necessary to carry over the whole of the water, and in this case the solvent is not recycled; the distillation is stopped when no more aqueous phase is extracted, and the monoperphthalic acid is separated as in (a).

(c) A quantity of solvent is used slighly greater than the quantity theoretically necessary; distillation takes place without recycling the solvent and the operation is continued until the liquid phase is completely eliminated.

The methods according to (a) and (b) enable the per-acid to be readily carried in the form of a suspension in the solvent and they can readily be used as a continuous process. The second and third modes of application lead to an appreciable increase in yield.

The peroxidation reaction is carried out in accordance with the previously described conditions.

Below are given examples which illustrate the invention in a non-limiting way.

EXAMPLE 1

A litre of 1,2-dichloroethane and 74 g. (0.5 mole) of powdered phthalic anhydride are introduced into a two-litre double-walled cylindrical reactor. The temperature is raised to 40° C., then, accompanied by vigorous agitation, there are introduced 29.7 g. (0.6 mole) of hydrogen peroxide at 70% in weight, then 2.2 cc. of ammonia (corresponding to 0.025 mole). After the reaction has continued for 10 minutes, the temperature is lowered to 18° C. and acidification is carried out with 0.71 cc. (0.0125 mole) of pure concentrated sulphuric acid. The agitation is continued for 30 minutes, and the precipitate is drained.

This precipitate is dried at a pressure of 27 millibars for 1 hour at 22° C. and for 1 hour at 38° C.

97.9 g. of a powder are obtained, found on titration to be equivalent to 88.6% of per acid corresponding to a hydrolysis yield of 95.3%. After 24 hours, 3.7 g. of a powder are separated from the solvent, this powder on titration showing an equivalent of 44% of per acid.

EXAMPLE 2

In a litre of 1,2-dichloroethane, 74 g. (0.5 mole) of powdered phthalic anhydride, 29 g. (0.58 mole) of hydrogen peroxide at 70% in weight and 4.4 cc. of ammonia at 11.36 mol/litre are introduced into a reactor identical to that of Example 1. The operation is carried out at 29° C. and acidification takes place at 20° C. with 0.82 cc. of pure concentrated $H_2SO_4$.

After drying for 4 hours, under a pressure of 1.36 millibars, at between 22 and 40° C., by progressively increasing the temperature, 92.8 g. of a powder are obtained, showing, upon titration, an equivalent of 89.5% of per acid.

4.6 g. of a powder are separated from the solvent, this powder being equivalent to 23% of per acid on titration.

EXAMPLE 3

Using a reactor identical with those previously used, the operation is carried out in the same conditions as those of Example 2, but acidification being carred out with 1.9 cc. of orthophosphoric acid at 15 mol/litre.

After drying there collected 90.2 g. of a powder giving an equivalent of 89.6% of per acid on titration.

0.50 g. of a powder is separated from the solvent, this giving an equivalent of 72% of per acid on titration.

EXAMPLE 4

Under conditions identical with those of Example 2, the same reaction is carried out, but using a concentrated potash as the catalyst.

After drying, 96.7 g. of the powder are collected, which on titration give an equivalent of 87.2% of per acid.

EXAMPLE 5

The same reaction, carried out under conditions identical with the previous ones, but in which the catalyst used is caustic soda at 9.2 mol/litre, produces, after drying, 86.8 g. of a powder giving an equivalent of 90.2% of per acid on titration. The stability of this powder, kept for several months in open flasks at ambient temperature (22°±1° C.), is good. The titre loss in per acid is 0.30% per month. When the powder is kept at 36° C. in a dry atmosphere, this loss increases to only 1.08% per month.

1 g. of powder is extracted from the solvent, this, on titration, giving an equivalent of 70.3% of per acid.

EXAMPLE 6

1500 ml. of 1,2-dichloroethane and 148 g. (1 mole) of powdered phthalic anhydride are introduced into a 2-litre double-walled cylindrical reactor. The temperature is raised to 29° C. Then, accompanied by energetic agitation, 61.1 g. (1.24 mole) of 70% hydrogen peroxide followed by 10 ml. (0.1 mole) of an N 10 aqueous soda solution are introduced. The temperature rises to 32° C. After agitating for 10 minutes, 3.3 cc. (0.057 mole) of 98% sulphuric acid are introduced a drop at a time.

The reactor is put under a partial vacuum of 200 millibars, and a dichloroethane-water azeotrope with 49% water is distilled at 34–35° C. The water and the hydrogen peroxide are practically entirely eliminated when ¾ of the solvent have been distilled. The residual broth is drained by centrifuging. The product obtained weighs 189 g. and on titration shows an equivalent of 87.5% of monoperphthalic acid; it does not contain more than 0.13% of hydrogen peroxide and 0.35% of water. Fifty days later, after storing at 24° C.±1° C., the preparation on titration still gives an equivalent of 86.8% of monoperphthalic acid.

EXAMPLE 7

4 litres of 1,2-dichloroethane and 296 g. (2 moles) of powdered phthalic anhydride are introduced into a 6-litre spherical reactor. With the temperature maintained at 28° C. and agitating vigorously, 122.2 g. (2.48 moles) of 70% hydrogen peroxide are introduced, and then 20 ml. of N 10 aqueous soda, in 30 minutes.

The agitation is continued, and 6.6 ml. of 98% sulphuric acid are introduced a drop at a time. After 30 minutes, the equipment is put under a partial vacuum in the order of that of the previous example, and ⅞ of the solvent are distilled, this carrying over the water and the hydrogen peroxide azeotropically.

After filtration, 436.5 g. of a greenish-white powder, having a characteristic odour, are collected and this on titration provides an equivalent of 90.5% of monoperphthalic acid, 0.11% of hydrogen peroxide and 0.3% of water.

This powder still gives an equivalent of 88.4% of monoperphthalic acid, after storing for 150 days at a temperature of 24±3° C. at atmospheric humidity.

EXAMPLE 8

In a 2-litre double-walled reactor, fitted with agitation means, a reaction is carried out which is identical with that of Example 6, but in which 1500 ml. of trichloromethane are used as the solvent.

The precipitate obtained on completion of the reaction is separated by precipitation and it is then dried in a vacuum for 2 hours at 40° C.

The powder obtained gives an equivalent of 83.6% of monoperphthalic acid on titration.

EXAMPLE 9

With equipment similar to that of Example 6, the same reaction is carried out, but using 1,2-dichloropropane as the solvent.

After acidification, the reactor is put under a partial vacuum of 133 millibars so as to carry out distillation of the water-solvent azeotrope at 33–34° C. Distillation is continued until the dry state is reached.

The 198 g. of residual powder gives, on titration, an equivalent of 83.5% of monoperphthalic acid.

EXAMPLE 10

The reaction conditions of Example 6 are repeated, using 1,1,2-trichloro-1,2,2 trifluoroethane as the solvent.

By vigorous agitation, the phthalic anhydride is kept in suspension in this solvent. The solvent, practically inert at the reaction temperatures, has a vapour pressure such that distillation can be carried out at normal pressure. Since the azeotrope formed contains very little water, the distillation is carried out while recycling the solvent for 4 to 6 hours. Depending upon the temperatures at which the reaction is carried out, the yield of monoperphthalic acid varies over the range 82 to 90%.

What I claim is:

1. A method for the preparation of stable monoperphthalic acid comprising reacting, in a halogenated hydrocarbon of the group consisting of 1,2-dichloroethane, 1,1,2-trichloro-1,2,2-trifluoroethane, 1,2-dichloropropane, 1,1,2,2 - tetrachloroethane, and 1,1,2 - trichloroethane in which the resultant monoperphthalic acid is insoluble and at a temperature below the boiling temperature of said halogenated hydrocarbon, hydrogen peroxide in aqueous phase and phthalic anhydride in proportions of 0.5 to 1.5 atoms of active oxygen per molecule of phthalic anhydride, in the presence of an alkaline catalyst selected from the group consisting of sodium hydroxide, potassium hydroxide and ammonia in aqueous solution in catalytic amounts; acidifying the two-phase reaction medium upon completion of the peroxidation; and recovering the resultant precipitated monoperphthalic acid.

2. A method according to claim 1, characterized in that the alkaline catalyst is used in a quantity such that the cation/phthalic anhydride molar ratio is between 0.01 and 0.2, and the neutralizing agent is a strong mineral acid used in a quantity such that there is at least one acid equivalent per alkaline cation initially introduced and the reaction is conducted between ambient temperature and 40° C.

3. A method according to claim 1, characterized in that the reaction is conducted between ambient temperature and 40° C. and the water-immiscible halogenated hydrocarbon forms with water an azeotrope having a minimum boiling point, and on completion of the reaction, before separation of the monoperphthalic acid, the water and the residual hydrogen peroxide are extracted by azeotropic distillation.

4. A method according to claim 3, characterized in that the azeotropic distillation is carried out at a pressure such that the temperature is maintained at between 0 and 60° C.

5. A method according to claim 1, characterized in that the reaction is conducted between ambient temperature and 40° C. and the distillation is carried out at a pressure such that the temperature is maintained at between 10 and 40° C.

6. A method according to claim 3, characterized in that the vapors from the azetrope are condensed so as to eliminate the aqueous phase, the halogenated solvent being recycled as a continuation of the evaporation, and the operation being stopped when the aqueous phase is no longer extracted, and the monoperphthalic acid in suspension in the solvent being separated.

7. A method according to claim 3, characterized in that the quantity of solvent used is greater than is theoretically necessary to carry over all the water, the solvent is distilled without recycling.

8. A method according to claim 4, characterized in that the quantity of solvent is slightly greater than the quantity theoretically necessary for carrying over all the water, and the solvent is distilled without recycling until the liquid phase is completely eliminated.

9. A method according to claim 1, wherein the halogenated solvent is 1,2-dichloroethane.

References Cited

UNITED STATES PATENTS

| | | | |
|---|---|---|---|
| 2,877,266 | 3/1959 | Korach | 260—502 |
| 2,273,774 | 2/1942 | Reichert et al. | 260—502 |
| 2,284,477 | 5/1942 | Reichert et al. | 260—502 |
| 3,247,244 | 4/1966 | Blumberg et al. | 260—502 |

FOREIGN PATENTS

| | | |
|---|---|---|
| 550,490 | 7/1941 | Great Britain. |
| 561,180 | 5/1944 | Great Britain. |
| 891,211 | 3/1962 | Great Britain. |
| 1,354,160 | 1/1964 | France. |
| 1,371,865 | 9/1964 | France. |

BERNARD HELFIN, Primary Examiner

W. B. LONE, Assistant Examiner